United States Patent Office 3,541,191
Patented Nov. 17, 1970

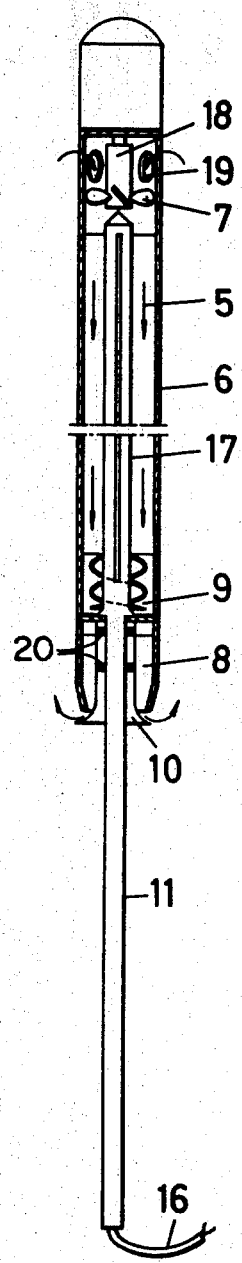
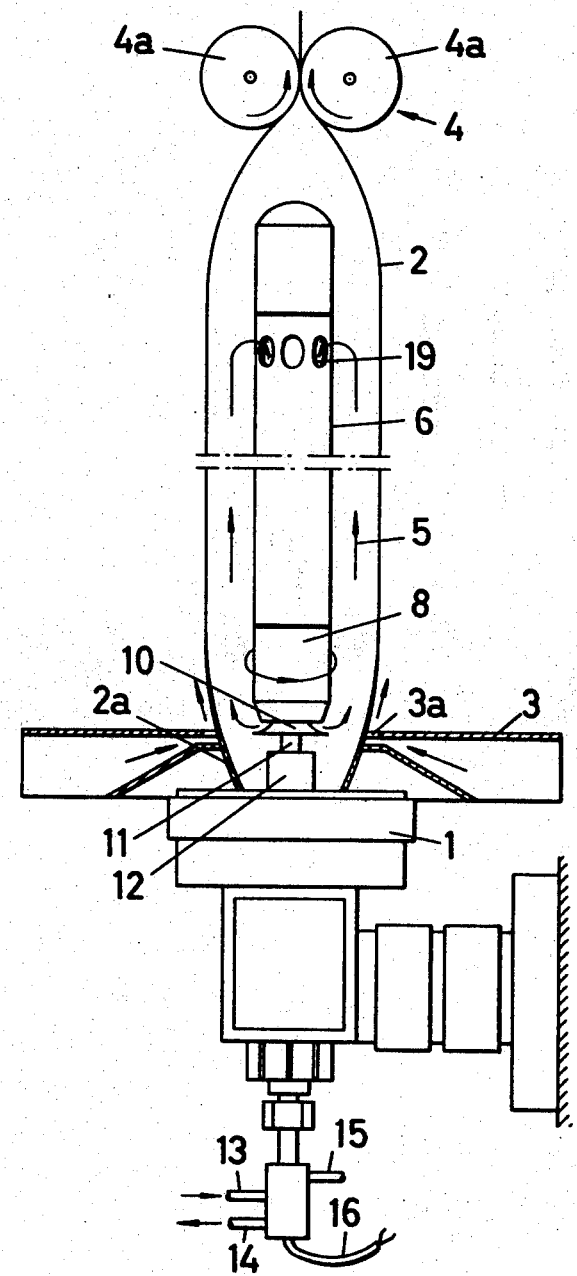

3,541,191
METHOD FOR MANUFACTURING FILM FROM THERMOPLASTIC RESINOUS FILM-FORMING MATERIALS
Jon Thordarson, 51 Skipholt, Reykjavik, Iceland
Original application Oct. 24, 1966, Ser. No. 589,135, now Patent No. 3,445,891, dated May 27, 1969. Divided and this application Feb. 11, 1969, Ser. No. 798,377
Claims priority, application Norway, Oct. 27, 1965, 160,235/65
Int. Cl. B29c 17/02, 23/00, 25/00
U.S. Cl. 264—37
6 Claims

ABSTRACT OF THE DISCLOSURE

A method is described for the continuous extrusion of thermoplastic seamless tubing which is immediately cooled following extrusion by a radially directed cooling gas against the internal surface of the tube. To insure that the cooling gas stream is uniform and thus minimize irregularities in the extruded tubing, the air stream is projected radially from the center of the tubing through a rotating annular outlet passage whereby any irregularities in the cross-section of the air stream or in the surface of the outlet passage itself are cancelled out.

---

This application is a division of my copending application Ser. No. 589,135, filed Oct. 24, 1966, now Pat. No. 3,445,891.

The present invention relates to an improved method for extruding seamless tubing or film. In such method a film-forming polymer such as polyethylene is extruded through an annular die arranged in an extrusion head in which a thorough homogenizing of the thermoplastic material is effected prior to the extrusion itself. The material is extruded so as to form a tube having a smaller outlet diameter than the intended diameter of the final product, the freshly extruded tube being inflated by gas under air pressure maintained inside the tube. This can conveniently be accomplished by compressing the cooled and set tubing some distance from the extrusion head whereby a bubble is formed. A constant communication between the bubble and a source of gas or air under constant pressure is maintained whereby the freshly extruded tubing in inflated and expanded gradually giving it a smaller wall thickness. Finally, when the material has been cooled to a sufficient degree as it moves further away from the extrusion head, expansion will cease. The resultant product will be a film tube having a wall thickness which within certain limits is substantially uniform. The cooled and set tubing is compressed between rolls which serve to draw the tubing away from the extrusion head as well as prevent the escape of air from the bubble.

The air trapped in the bubble will gradually acquire a high temperature which inherently represents an obstacle to an unlimited increase of the extrusion velocity. External cooling of the freshly extruded tubing has therefore normally been applied to the bubble in order to thereby permit an increase of the extrusion velocity.

An object of the present invention is a method permitting internal cooling of the bubble, comprising cooling the gas within the bubble while being retained therein and projecting the cooled gas stream in a generally radially direction but at the same time imparting a helical motion to the stream.

To demonstrate the method of the present invention, an apparatus is described in the ensuing description, reference being made to the accompanying figures wherein:

FIG. 1 is a schematic view of the apparatus with the extrusion head supporting a cooling column, and illustrating the principle of the air circulation; and FIG. 2 is a view partly in section of the cooling element.

In FIG. 1, 1 is an extrusion head for production of a film tube 2, which is extruded in the form of a tube 2a having somewhat higher wall thickness than that envisaged for the ultimate film tube 2. 3 is an external blowing box having a circular slot 3a which directs cooling air upwardly around the extruded film tube 2. The film tube is drawn off by means of wind-up rolls 4 which also serve as a gas trap by being pressed too strongly against each other that the air in the bubble cannot escape. The film tube 2 is then wound up on rolls or cut in a manner known per se. The flow direction of the air is indicated with arrows 5, i.e., upwardly in the space between a cooling column 6 and the film tube 2, and downwardly in the cooling column 6. An electrically driven fan 7 is mounted at the top of the cooling column, in the illustrated embodiment within the cooling column. At the lower end, the cooling column 6 is provided with a freely rotating air nozzle 8 to the end of securing uniform discharge of the air which has been subjected to cooling when passing downwardly through the column 6. The rotating nozzle 8, together with stationary helical baffles 9 mounted within the lowermost portion of the column 6, operates to endow the air with a helical movement to the effect that the air, after having caused the nozzle 8 to rotate and passing through the lowermost portion 10 of the rotating nozzle, which is provided with at least one or more radially directed outlet channel, is directed substantially radially towards the film tube 2a, 2.

As also shown in FIG. 1, a hollow mast 11 is provided for the purpose of assembling the apparatus on the central core 12 of the extrusion head 1. The mast 11 is passed through said central core, and the cavity of the same accommodates pipings 13, 14 for supply and discharge, respectively, of colling water, pipe 15 for supply of air under a constant static pressure for the inflation of the film tube 2 to the bubble form referred to above, as well as leads 16 for electric power for operating the fan means 7.

FIG. 2 is a more detailed view of the cooling column 6 and clearly shows how the circulation of the air in the bubble is effected. The cooling column 6 is hollow and holds an elongated cooling element 17 through which the cooling water flows. The fan 7 is mounted at the top of the cooling column and is driven by an electric motor 18 for the purpose of drawing heated air from the top portion of the bubble inwardly through the perforations 19 at the top of the cooling column and to force such air downwardly through the column and along the length of the cooling element 17. The stationary, helically shaped baffles 9 which endow the cooled air with a rotational movement are mounted in the lower end of the column so that the nozzle 8, which is freely rotatably mounted with bearings 20 on the lower end of the column, is caused to rotate. The nozzle 8 is provided with one or more substantially radially directed outlet passages. Consequently, the air is endowed with a rotational movement so that the cold air leaving the column 6 is directed essentially radially towards the film tube 2a and provides a uniform cooling of the same.

In the device shown and described, air is used as inflating and cooling agent, but evidently, use might equally well be made of more inert gases, such as carbon dioxide, nitrogen, etc. for the same purposes. Moreover, it will be understood that other coolants than water might be used as a coolant to the gas within the bubble, although water in most cases will represent thhe most practical solution.

The apparatus may, of course, advantageously be provided with known means for external cooling of the film tube, such as a blowing box provided with an annular slot surrounding the extrusion head, so as to direct cold air upwardly all around the exterior of the extruded film tube.

By constantly circulating one and the same quantity of air through the cooling column and blowing it against the inner film surface, a uniform and highly effective cooling of the film is obtained. It has been found that it is possible to increase the extrusion velocity for the film by more than fifty percent in relation to previously known techniques with only external cooling of the film tube. The uniform cooling induces a definite quality improvement both as to uniformity in film thickness and homogenity in the film product. At the same time the improved cooling affect allows the use of a bubble of a shorter length than hitherto has been possible.

I claim:

1. In a method for producing a thermoplastic seamless tube, the steps comprising continuously extruding thermoplastic material in the form of seamless tubing, continuously withdrawing the tubing from the point of extrusion, directing a cooling gas stream through the extruded tubing in an axial direction opposite to the direction of withdrawal of said tubing towards the point of extrusion, imparting a helical motion to said stream as said stream moves in said axial direction, and then directing said stream having a helical flow pattern radially along a path against the interior surface of said tubing and away from said point of extrusion to cool the tubing.

2. The method for producing a thermoplastic seamless tube comprising the steps of continuously extruding thermoplastic material in the form of seamless tubing, continuously withdrawing the tubing from the point of extrusion, imparting the helical motion to a cooling gas stream while passing said gas stream in an axial direction toward said point of extrusion, and then directing said stream having a helical flow pattern radially against the inner surface of said tubing and in the direction of extrusion of said tubing to cool the tubing.

3. A method as claimed in claim 2 wherein said helical motion is imparted to said cooling gas stream while being directed in an axial direction through the extruded tubing towards the point of extrusion.

4. A method as claimed in claim 2 comprising continuously recirculating said cooling gas stream, said stream, having a helical flow pattern and having been directed along the interior surface of said tubing in the direction of withdrawal, being drawn away from the interior surface of said tubing, directing said stream in the direction opposite to the direction of withdrawal, a helical motion being imparted to said stream and said stream being radially directed against the interior surface of said tubing continuously.

5. A method as claimed in claim 2 wherein said cooling gas stream is directed radially towards the interior surface of said tubing between continuously rotating surfaces, the space between said surfaces through which said stream passes being unobstructed, whereby a uniform omni-radial stream of cooling gas is generated.

6. A method as claimed in claim 2 wherein said cooling gas stream is drawn away from the interior surface of said tubing and cooled.

References Cited

UNITED STATES PATENTS

| | | | |
|---|---|---|---|
| 2,632,206 | 3/1953 | Pierce | 264—95 |
| 2,947,031 | 8/1960 | Chow et al. | 264—95 |
| 3,170,011 | 2/1965 | Cheney et al. | 264—95 |
| 3,329,999 | 7/1967 | Cook. | |

ROBERT F. WHITE, Primary Examiner

J. H. SILBAUGH, Assistant Examiner

U.S. Cl. X.R.

264—95, 237

Notice of Adverse Decision in Interference

In Interference No. 99,093 involving Patent No. 3,541,191, J. Thordarson, METHOD FOR MANUFACTURING FILM FROM THERMOPLASTIC RESINOUS FILM-FORMING MATERIALS, final judgment adverse to the patentee was rendered Dec. 31, 1975, as to claims 1, 2, 3, 5 and 6.

[*Official Gazette March 23, 1976.*]